United States Patent
Zeller et al.

(10) Patent No.: US 10,847,825 B2
(45) Date of Patent: Nov. 24, 2020

(54) CHLORALKALI PROCESS

(71) Applicant: OCCIDENTAL CHEMICAL CORPORATION, Dallas, TX (US)

(72) Inventors: Robert L. Zeller, Flower Mound, TX (US); Clifton T. Gonce, Maurepas, LA (US)

(73) Assignee: Occidental Chemical Corporation, Dallas, TX (US)

( * ) Notice: Subject to any disclaimer, the term of this patent is extended or adjusted under 35 U.S.C. 154(b) by 144 days.

(21) Appl. No.: 15/740,882

(22) PCT Filed: Jun. 6, 2017

(86) PCT No.: PCT/US2017/036096
§ 371 (c)(1),
(2) Date: Dec. 29, 2017

(87) PCT Pub. No.: WO2017/214104
PCT Pub. Date: Dec. 14, 2017

(65) Prior Publication Data
US 2020/0036024 A1    Jan. 30, 2020

Related U.S. Application Data

(60) Provisional application No. 62/346,002, filed on Jun. 6, 2016.

(51) Int. Cl.
*H01M 8/06*     (2016.01)
*C25B 1/46*     (2006.01)
(Continued)

(52) U.S. Cl.
CPC ............. *H01M 8/0693* (2013.01); *C25B 1/46* (2013.01); *C25B 9/10* (2013.01); *C25B 13/08* (2013.01); *H01M 8/083* (2013.01)

(58) Field of Classification Search
CPC ....... H01M 8/0693; H01M 8/083; C25B 1/46; C25B 9/10
(Continued)

(56) References Cited

U.S. PATENT DOCUMENTS 4,093,531 A    6/1978  Babinsky
4,246,078 A    1/1981  Broniewski
(Continued)

FOREIGN PATENT DOCUMENTS

EP    0019717 A1    12/1980

OTHER PUBLICATIONS

International Search Report dated Sep. 20, 2017 for corresponding PCT/US2017/036096.

*Primary Examiner* — James M Erwin
(74) *Attorney, Agent, or Firm* — Renner, Kenner; Arthur M. Reginelli (57) ABSTRACT

A method of the type where a brine solution is converted to an alkali metal hydroxide solution within a diaphragm cell, and the resulting cell liquor from the diaphragm cell is introduced to one or more fuel cells for the conversion of the alkali metal hydroxide to form electricity, the improvement comprising regulating the conversion of alkali metal hydroxide within the fuel cell to a conversion of less than 90%, and then subsequently concentrating the alkali metal hydroxide concentration from the anolyte stream of the fuel cell.

25 Claims, 4 Drawing Sheets

(51) Int. Cl.
 *C25B 9/10* (2006.01)
 *C25B 13/08* (2006.01)
 *H01M 8/083* (2016.01)

(58) Field of Classification Search
 USPC .......................................................... 429/409
 See application file for complete search history.

(56) References Cited

U.S. PATENT DOCUMENTS

| | | | |
|---|---|---|---|
| 4,415,413 A | 11/1983 | Veber | |
| 4,459,188 A * | 7/1984 | Rutherford | C25B 15/08 |
| | | | 205/536 |
| 4,647,351 A | 3/1987 | Gelb | |
| 2005/0242032 A1 * | 11/2005 | Sugito | C02F 1/44 |
| | | | 210/641 |
| 2014/0299546 A1 * | 10/2014 | Eckert | B01D 61/12 |
| | | | 210/651 |

* cited by examiner

CHLORALKALI PROCESS

This application is a National-Stage application of PCT/US2017/036096 filed on Jun. 6, 2017, which claims the benefit of U.S. Provisional Application Ser. No. 62/346,002 filed on Jun. 6, 2016, which are incorporated herein by reference.

FIELD OF THE INVENTION

Embodiments of the present invention are directed toward chloralkali processes that include the electrolysis of alkali metal chlorides and the use of the resultant alkali metal hydroxide as an electrolyte within a fuel cell to produce a first stream including an alkali metal hydroxide and appreciable chlorides, and a second stream that is relatively concentrated in alkali metal hydroxide and substantially free of chlorides.

BACKGROUND OF THE INVENTION

Chloralkali processes electrolytically convert brine solutions to caustic solutions and chlorine gas. Two types of electrolytic cells are generally used in commercial chloralkali processes. The first is a diaphragm cell, which typically includes a diaphragm separator that can be asbestos or other inert materials. The second is a membrane cell, which typically includes an ion exchange membrane separator. Diaphragm cells are continuously fed with brine solutions at a rate faster than the conversion rate. As a result, unreacted alkali metal chlorides (e.g. sodium chloride) pass through the diaphragm and remain in the resultant catholyte solution. For example, a typical catholyte solution, which is also referred to as cell liquor, from a typical diaphragm cell includes about 10-12% alkali metal hydroxide (e.g. sodium hydroxide) and about 15% alkali metal chloride (e.g. sodium chloride). For some end uses, the presence of these chlorides renders the caustic solution less marketable. Also, since it is desirable to produce caustic solutions at about 50% concentration, intense energy is required to convert (which typically takes place through evaporative processes) the dilute caustic solution to the more desirable concentrated solutions, which are commonly referred to as diaphragm-grade caustic solutions. Solid alkali metal salts (e.g., sodium chloride) are precipitated during the evaporation process due to solubility limitations in the alkali metal hydroxide solution (e.g., sodium hydroxide). This solid metal salt is useful in chlor-alkali operations as a way to concentrate incoming dilute alkali metal chloride solutions used as a raw material.

Membrane cells are designed to preclude passage of chloride ions into the catholyte solution, and therefore membrane cells are typically capable of producing catholyte solutions that include about 30-32 wt % alkali metal hydroxide (e.g. sodium hydroxide) and less than 100 ppm alkali metal chloride (e.g. sodium chloride). This catholyte solution, either direct from the cell or concentrated, is typically marketed as membrane-grade caustic solution. The membranes used in membrane cells are more costly and are more sensitive to impurities in the brine solution, which must be purified to ensure that impurities, such as alkaline earth species (e.g. calcium, magnesium and barium), are at or below a parts-per-billion (ppb) level to avoid damaging the membrane, which reduces efficiency, adds cost, and potentially reduces the safety of the operation. Diaphragm separators, on the other hand, are more robust and can tolerate impurities at the part-per-million (ppm) level.

Because membrane cells and the systems associated with membrane cells are a relatively recent innovation and converting diaphragm cells to membrane cells can be cost prohibitive, diaphragm cells are a reality in many industrial processes. In view of this, processes have been proposed to improve the efficiencies of diaphragm cells. For example, U.S. Pat. No. 4,093,531 proposes a process for purifying and concentrating a cell liquor from a diaphragm cell by using a three component electrolytic cell including an anode section, a cathode section, and a central compartment. Hydrogen gas is fed to the anode compartment, cell liquor from a diaphragm cell is fed to the central compartment, and concentrated sodium hydroxide is fed to the cathode compartment. The process produces a concentrated caustic solution including about 30-40% sodium hydroxide and 0.1-0.5% sodium chloride, and a second stream that is a brine solution including about 18% sodium chloride and 0.5-6% sodium hydroxide.

U.S. Pat. No. 4,415,413 proposes a process for the simultaneous production of an alkali metal hydroxide and energy by using a cascade of hybrid cells, which operate as electrochemical generators that can return electrical energy to the chloralkali process and thereby offset the energy requirements of the chloralkali process. At the same time, the cascade of hybrid cells produce an anolyte solution including about 15-22% metal halide (e.g. sodium chloride) together with only trace amounts of alkali metal hydroxide, and a catholyte solution stream that includes at least 40% alkali metal hydroxide (e.g. sodium hydroxide) that is substantially chloride free.

SUMMARY OF THE INVENTION

One or more embodiments of the present invention provide a method for the production of alkali metal hydroxide solution, the method comprising: (i) treating a brine solution within a diaphragm cell to produce a first catholyte stream including from about 1 to about 20 wt % alkali metal hydroxide and about 1 to about 25 wt % alkali metal chloride; and (ii) treating the first catholyte stream within a fuel cell to produce a first anolyte stream including from about 1 to about 20 wt % alkali metal hydroxide and from about 1 to about 25 wt % alkali metal chloride and a second catholyte stream including from about 25 to about 40 wt % alkali metal hydroxide and less than 500 ppm alkali metal chloride.

Yet other embodiments of the present invention provide a method of the type where a brine solution is converted to a alkali metal hydroxide solution within a diaphragm cell, and the resulting cell liquor from the diaphragm cell is introduced to one or more fuel cells for the conversion of the alkali metal hydroxide to form electricity, the improvement comprising regulating the conversion of alkali metal hydroxide within the fuel cell to a conversion of less than 90%, and then subsequently concentrating the alkali metal hydroxide concentration from the anolyte stream of the fuel cell.

DETAILED DESCRIPTION OF ILLUSTRATIVE EMBODIMENTS

Embodiments of the invention are based, at least in part, on the discovery of a process for the dual production of a first caustic solution stream that includes a relatively high concentration of alkali metal hydroxide and that is substantially free of chlorides, and a second caustic solution stream having lower alkali metal hydroxide content together with appreciable alkali metal chloride salts. Stated another way, the process simultaneously produces membrane-grade caustic solution and diaphragm-grade caustic solution. The process of the invention advantageously employs diaphragm cells to produce a cell liquor stream by using conventional technology, and then the cell liquor stream is partially treated within one or more alkaline fuel cells. Advantageously, the second caustic solution stream, which may be referred to as the depleted cell liquor stream, includes sufficient alkali metal hydroxide to allow the subsequent concentrating of the stream to thereby produce commercially viable caustic solutions. While the prior art proposes chloralkali systems that employ diaphragm cells in conjunction with alkaline fuel cells, the process of the present invention regulates operation of the fuel cell to provide an anolyte solution stream that includes sufficient alkali metal hydroxide (i.e. provides a depleted cell liquor stream) that can be concentrated to produce diaphragm-grade caustic solution. By regulating the anolyte solution in this manner, the process of the invention advantageously avoids the severe conditions that would otherwise be required to produce anolyte solutions that include low levels of alkali metal hydroxide. These severe conditions impact the overall efficiency of the system by, for example, shortening the life of the membranes employed in the fuel cells. Likewise, by maintaining sufficient alkali metal hydroxide concentration within the anolyte stream, the fuel cells employed in the practice of the present invention do not experience a significant pH gradient, which is otherwise experienced is alkaline fuels cells of this nature (as well as chloralkali processes that employ membrane cells) and which have a negative impact on the longevity of the fuel cells. Further, the process of the invention allows for the production of a membrane-grade stream without the need for purifying the brine feed stream.

Process Overview

Figure 1:
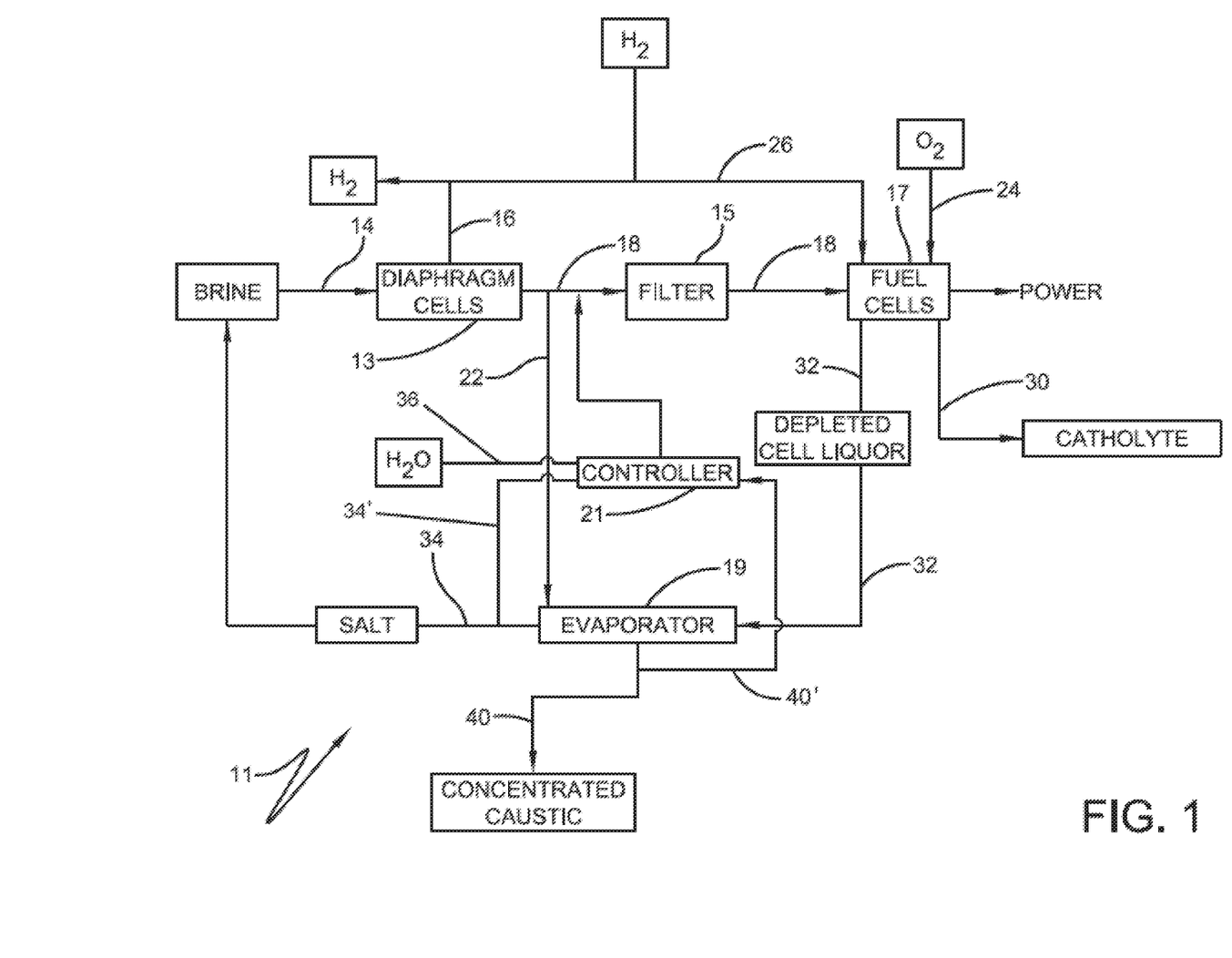
FIG. 1 is a flow chart of a chloralkali process according to embodiments of the present invention.

An overview of one or more embodiments of the present invention can be described with reference to FIG. 1, which shows chloralkali process 11 including diaphragm cells 13 that receive brine stream 14 and produce therefrom a hydrogen stream 16 and a cell liquor stream 18. Cell liquor stream 18 may optionally be filtered at filter system 15. Whether or not filtered, cell liquor stream 18 is transferred to a fuel cell system 17, which may be referred to as alkaline fuel cell system 17, cell liquor fuel cell system 17, or simply cell system 17. Hydrogen feed 26, which may include input from hydrogen stream 16 from diaphragm cells 13, and oxygen feed 24, are also fed to cell system 17, which produces a first product stream 30 and a second product stream 32. First product stream 30, which may be referred to as catholyte stream 30, includes a relatively high concentration of alkali metal hydroxide while being substantially free of chlorides. First product stream 30 can optionally be concentrated to thereby produce a membrane-grade caustic solution.

Cell system 17 simultaneously produces a second product stream 32, which may be referred to as depleted cell liquor stream 32 or anolyte stream 32, which includes useful levels of alkali metal hydroxide and appreciable levels of chlorides. Depleted cell liquor stream 32 can then be concentrated within, for example, an evaporation system 19 to produce a concentrated caustic solution stream 40, which may be referred to as a diaphragm-grade caustic stream 40. Salt stream 34 from evaporation system 19 can be fed to brine stream 14.

In one or more embodiments, depleted cell liquor stream 32 is concentrated to provide a diaphragm-grade caustic stream that includes greater than 15 wt %, in other embodiments greater than 20 wt %, in other embodiments greater than 30 wt %, and in other embodiments greater than 40 wt % alkali metal hydroxide (e.g. sodium hydroxide). Additionally, further treatment (which occur as part of the step of concentrating (e.g. evaporation)) may also reduce the alkali metal chloride content of the anolyte stream to produce a diaphragm-grade caustic stream that includes less than 20 wt %, in other embodiments less than 10 wt %, in other embodiments less than 5 wt %, and in other embodiments less than 2 wt % alkali metal chloride (e.g. sodium chloride). In these or other embodiments, diaphragm-grade caustic stream 40 includes from about 0.5 wt % to about 13 wt %, in other embodiments from about 0.9 wt % to about 5 wt %, and in other embodiments from about 1.0 wt % to about 1.2 wt % alkali metal chloride (e.g. sodium chloride).

In one or more embodiments, the ionic strength of cell liquor stream 18 may be adjusted. This can be accomplished by introducing caustic (e.g. concentrated sodium hydroxide), salt (e.g. sodium chloride), and/or water to cell liquor stream 18. In one or more embodiments, process 11 includes ionic-strength controller 21, which can receive feed stream 40' from caustic stream 40, salt stream 34' from salt stream 34, or water steam 36, and then introduce one or more of these constituents to cell liquor stream 18 as system requirements demand. By adjusting the ionic strength of cell liquor stream 18, the osmotic pressure gradient across the cation exchange membrane within cell 17 can be reduced, which allows the electro-osmotic water transport across the membrane to be controlled, thereby improving membrane life and additionally reducing the chloride concentration in first product stream 30.

Accordingly, in one or more embodiments, the process of the present invention employs a fuel cell to partially convert alkali metal hydroxide (e.g. sodium hydroxide) within cell liquor from a diaphragm cell (e.g. stream 18) to generate electricity and provide for the formation of an alkali metal hydroxide solution stream (i.e. fuel cell catholyte stream 30) that includes a relatively high concentration of alkali metal hydroxide that is substantially free of chlorides. This partial conversion, which can be regulated via hydrogen and oxygen feed rates to the fuel cell (and/or the feed rate of the cell liquor fed to the cell) provides for relatively mild conditions within the fuel cell. These relatively mild conditions within the fuel cell provide several advantages including, but not limited to, membrane life and the ability to tolerate relatively high level of impurities. In one or more embodiments, the level of alkali metal hydroxide conversion within fuel cell 17 can be quantified as percent reduction in alkali metal hydroxide between the input cell liquor (i.e. stream 18) and the resulting anolyte steam (i.e. stream 30). In one or more embodiments, the process of the present invention provides, by operation of the fuel cell, a reduction of from about 10 to about 90%, in other embodiments from about 15 to about 50%, or in other embodiments from about 20 to about 30% of the alkali metal hydroxide content (e.g. sodium hydroxide) within the cell liquor stream (i.e. stream 18). Stated another way, the conversion of alkali metal hydroxide within the fuel cell is maintained at less than 90%, in other embodiments less than 50%, and in other embodiments less than 30% conversion.

Because depleted cell liquor includes sufficient concentration of alkali metal hydroxide, evaporator system 19 may advantageously be of the type typically used in concentrating cell liquor from a diaphragm cell, which evaporators are typically constructed of nickel and/or stainless steel (e.g., 316L and 304L) components. If depleted cell liquor 32 contains an alkali metal hydroxide concentration of less than 1 wt %, excessive corrosion will occur in evaporator system 19 thereby requiring upgraded equipment of the type constructed of Hastelloy, Monel, or titanium (e.g., typical vacuum salt evaporator materials of construction), which is expensive. Advantageously, by only partially converting the cell liquor in cell liquor fuel cell 17 (e.g. less than 90%), a conventional evaporator system, which already exists in most diaphragm cell plants, can be used without expensive material of construction upgrades to produce, for example, the valuable diaphragm-grade caustic soda product, as well as produce salt stream 34 for use in brine stream 14.

Characteristics of Cell Liquor

In one or more embodiments, cell liquor 18 includes from about 1 to about 20 wt %, in other embodiments from about 5 to about 18 wt %, and in other embodiments from about 7 to about 15 wt % alkali metal hydroxides (e.g. sodium hydroxide). In these or other embodiments, cell liquor 18 includes greater than 5 wt %, in other embodiments greater than 10 wt %, and in other embodiments greater than 12 wt % chlorides (e.g. sodium chloride). In one or more embodiments, cell liquor 18 includes from about 5 to about 25% (e.g. saturated with sodium chloride), in other embodiments from about 10 to about 22 wt %, and in other embodiments from about 12 to about 20 wt % chlorides.

Characteristics of Fuel Cell Catholyte Solution

In one or more embodiments, first product stream 30 (i.e. catholyte solution 30), prior to any optional concentration step, includes greater than 25 wt %, in other embodiments greater than 30 wt %, and in other embodiments greater than 32 wt % alkali metal hydroxides (e.g. sodium hydroxide). In these or other embodiments, first product stream 30 includes from about 25 to about 40 wt %, in other embodiments from about 28 to about 35 wt %, and in other embodiments from about 30 to about 32 wt % alkali metal hydroxides. In these or other embodiments, first product stream 30 includes less than 500 ppm, in other embodiments less than 300 ppm, and in other embodiments less than 100 ppm chlorides (e.g. sodium chloride).

Characteristics of Fuel Cell Anolyte Solution

In one or more embodiments, depleted liquor stream 32 (i.e. anolyte solution 32) includes greater than 1 wt %, in other embodiments greater than 5 wt %, and in other embodiments greater than 10 wt % alkali metal hydroxides (e.g. sodium hydroxide). In these or other embodiments, depleted liquor stream 32 includes less than 15 wt %, in other embodiments less than 12 wt %, in other embodiments less than 10 wt %, and in other embodiments less than 8 wt % alkali metal hydroxides. In one or more embodiments, depleted liquor stream 32 includes from about 1 to about 20 wt %, in other embodiments from about 3 to about 18 wt %, in other embodiments from about 5 to about 15 wt % alkali metal hydroxides, and in other embodiments from about 6 to about 8 wt % alkali metal hydroxides. In one or more embodiments, second product stream 32 includes greater than 5 wt %, in other embodiments greater than 15 wt %, and in other embodiments greater than 25 wt % chlorides (e.g. sodium chloride). In these or other embodiments, second product stream 32 includes from about 1 to about 25 wt % (e.g. saturated with sodium chloride), in other embodiments from about 5 to about 20 wt %, and in other embodiments from about 12 to about 18 wt % chlorides.

Cell Liquor Fuel Cell

Figure 2:
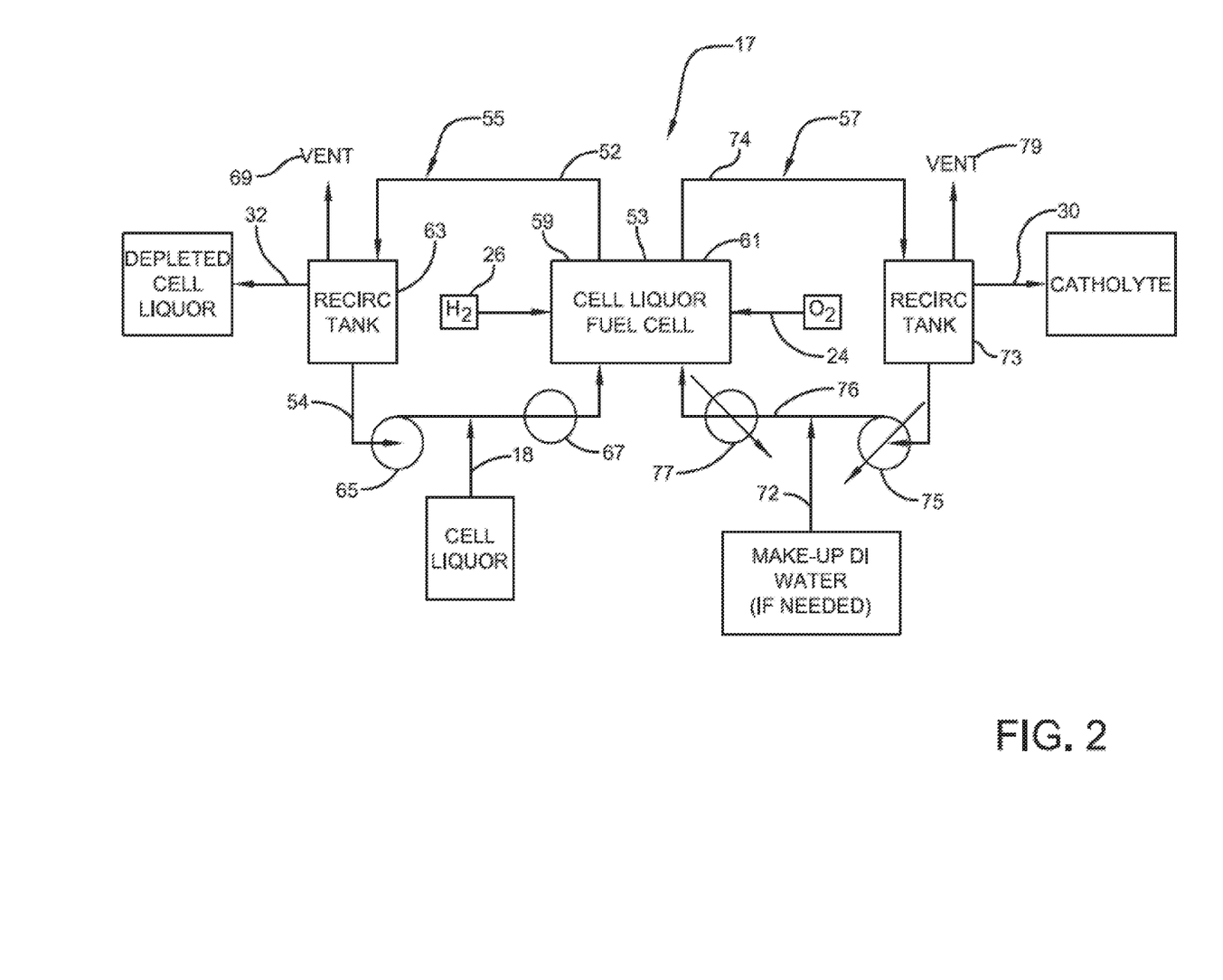
FIG. 2 is a schematic diagram of a cell liquor fuel cell system employed in one or more embodiments of the present invention.

The cell liquor fuel cell system 17 of one or more embodiments of the present can be described with reference to FIG. 2. According to one or more embodiments, cell system 17 includes fuel cell 53, embodiments of which will be described in greater detail below, anolyte loop 55, and catholyte loop 57. Anolyte loop 55 is in fluid communication with anode compartment 59 of fuel cell 53, and catholyte loop 57 is in fluid communication with cathode compartment 61 of fuel cell 53.

According to this embodiment, anolyte loop 55 receives cell liquor stream 18 from diaphragm cells 13 (shown in FIG. 1) and feeds cell liquor stream 18 to anode compartment 59 of fuel cell 53. At the same time, hydrogen stream 26, which may include a humid hydrogen stream 26, is injected into anode compartment 59 of fuel cell 53. Anolyte stream 52 exits anode compartment 59 and is directed toward recirculation tank 63 where anolyte stream 52 can be removed from loop 55 as depleted cell liquor stream 32 or directed back to anode compartment 59 via recirculation stream 54 via optional recirculation pump 65. In one or more embodiments, heat may be removed from or introduced to loop 55 via heat exchanger 67. Also, volatiles, inerts, or unreacted hydrogen may be removed from loop 55 via vent 69.

Similarly, according to this embodiment, catholyte loop 57 optionally receives water (e.g. deionized water) from water stream 72 prior to introducing recirculation stream 76 to cathode compartment 61 of fuel cell 53. As the skilled person will appreciate, water may optionally be added to maintain mass balance and to maintain desirable characteristics of recirculation stream 76. Oxygen stream 24, which may include a humid oxygen stream 24, is introduced into cathode compartment 61 of fuel cell 53. Catholyte stream 74 exits cathode compartment 61 and is directed toward recirculation tank 73 where catholyte stream 74 can be removed from loop 57 as catholyte stream 30 or directed back to cathode compartment 61 via recirculation stream 76 via optional recirculation pump 75. In one or more embodiments, heat may be removed from or introduced to loop 57 via heat exchanger 75. Also, volatiles, inerts, or unreacted hydrogen may be removed from loop 57 via vent 79.

Fuel cell 53 of cell system 17 employed in one or more embodiments of the invention can be described with reference to FIG. 3. Here, fuel cell 53 includes anode compartment 59, cathode compartment 61, and ion exchange membrane 83. Anode compartment 59 includes anode 85, which may include a gas diffusion anode 85. Anode 85 divides compartment 59 and thereby forms an outer chamber 87 and inner chamber 89. Similarly, cathode compartment 61 includes cathode 95, which may include a gas diffusion cathode 95 (e.g. oxygen depolarized cathode). Cathode 95 divides compartment 61 and thereby forms an outer chamber 97 and inner chamber 99. Anode 85 and cathode 95 are connected via circuit 101.

With respect to the ion-exchange membrane (i.e. membrane 83), several membranes may be useful including those conventionally used in the art of chloralkali processes that employ membrane separators. These membranes may include synthetic polymeric membranes with ionic properties such as ionomers. In one or more embodiments, the membranes may include fluoropolymer-based membranes such as those that include sulfonic groups and/or carboxylic groups. In particular embodiments, membranes with multiple layers are employed including those that include at least one layer including sulfonic groups, at least one layer including carboxylic groups, and/or at least one layer including both sulfonic and carboxylic groups. In particular embodiments, those membranes that predominately include carboxylic groups are employed. In one or more embodiments, the layers of the multilayered membranes may be oriented. In particular embodiments, at least one layer, such as the layer including carboxylic functionality, is oriented toward the cathode. In other embodiments, at least one layer, such as the layer including carboxylic functionality, is oriented toward the anode.

During operation, hydrogen stream 26 is fed to anode compartment 59 via inlet 88 within outer chamber 87. Hydrogen gas diffuses through anode 85 and contacts cell liquor within inner chamber 89 that is introduced via inlet 86 from feed stream 54. As described with reference to FIGS. 1 and 2, feed stream 54 receives cell liquor stream 18 from diaphragm cells 13. Similarly, oxygen stream 24 is fed to cathode compartment 61 via inlet 98 within outer chamber 97. Oxygen gas diffuses through anode 95 and contacts feed caustic (optionally diluted with water) within inner chamber 99 that is introduced via inlet 96 from feed stream 76. As described with reference to FIGS. 1 and 2, feed stream 76 optionally receives feed water stream 72. Cell liquor flows through inner chamber 89 from inlet 86 to outlet 90, and the hydroxide ion content of the cell liquor is reduced to target levels through consumption of the hydroxide ion by electrochemical oxidation reactions taking place between the hydrogen gas and hydroxide ions at anode 85. As a result, anolyte stream 52 is formed, which gives rise to depleted cell liquor stream 32. At the same time, oxidation of hydrogen gas at anode 85 generates electrons that flow from anode 85 to cathode 95 via electrical circuit 101.

Alkali metal ions, such as sodium ions, disassociated from the hydroxide ions within inner chamber 89 of anode compartment 59 migrate through membrane 83 into the inner chamber 99 of cathode compartment 61. Feed caustic (optionally diluted with water) flows through inner chamber 99 from inlet 96 to outlet 100, and sodium ions that migrated from anode compartment 59 are associated with hydroxide ions generated by the dissociation of water through electrochemical reduction reactions at cathode 95. As a result, catholyte stream 74 is formed, from which product stream 30 is drawn.

Figure 3:
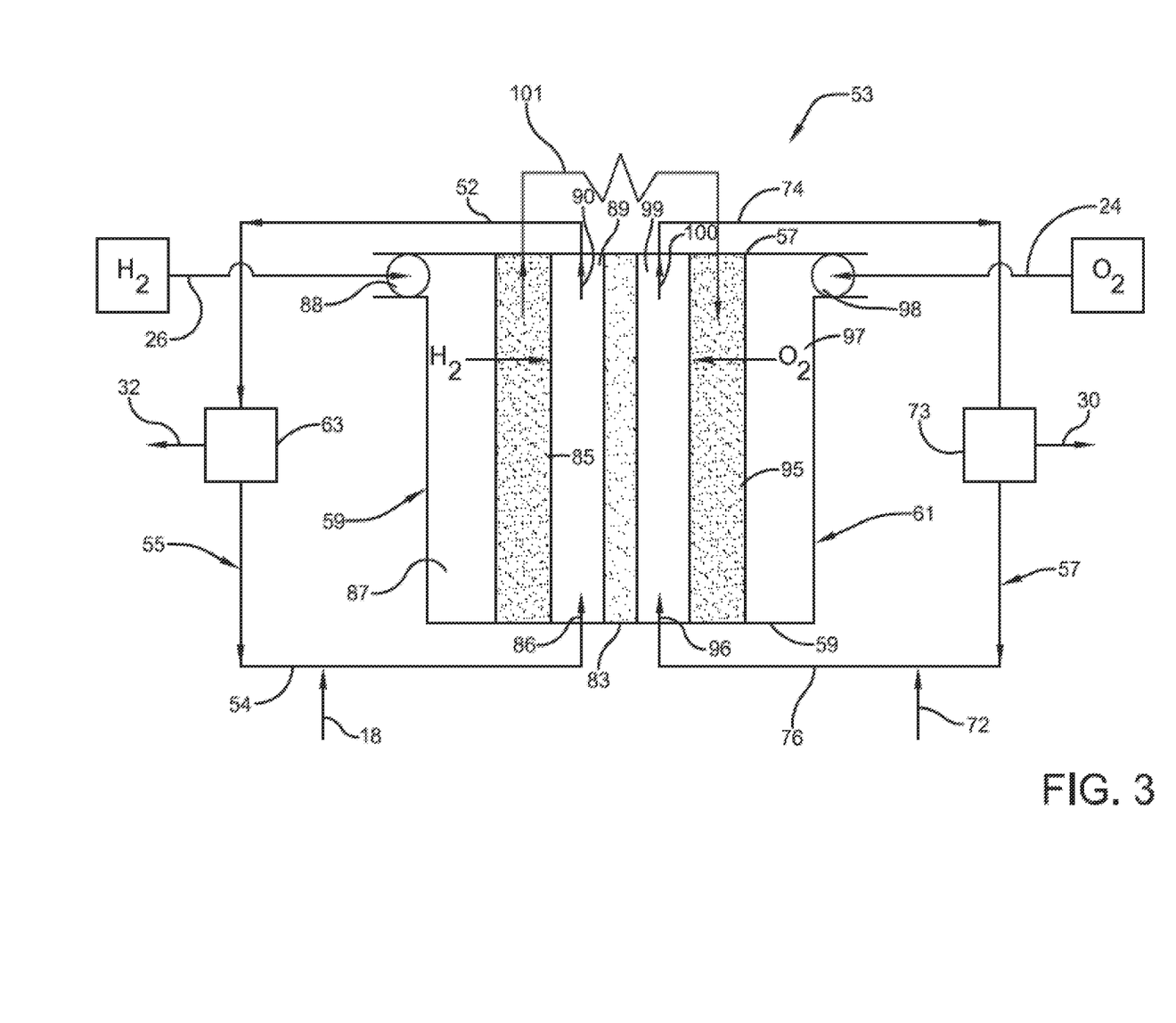
FIG. 3 is a schematic diagram of a cell liquor fuel cell employed in one or more embodiments of the present invention.
Figure 4:
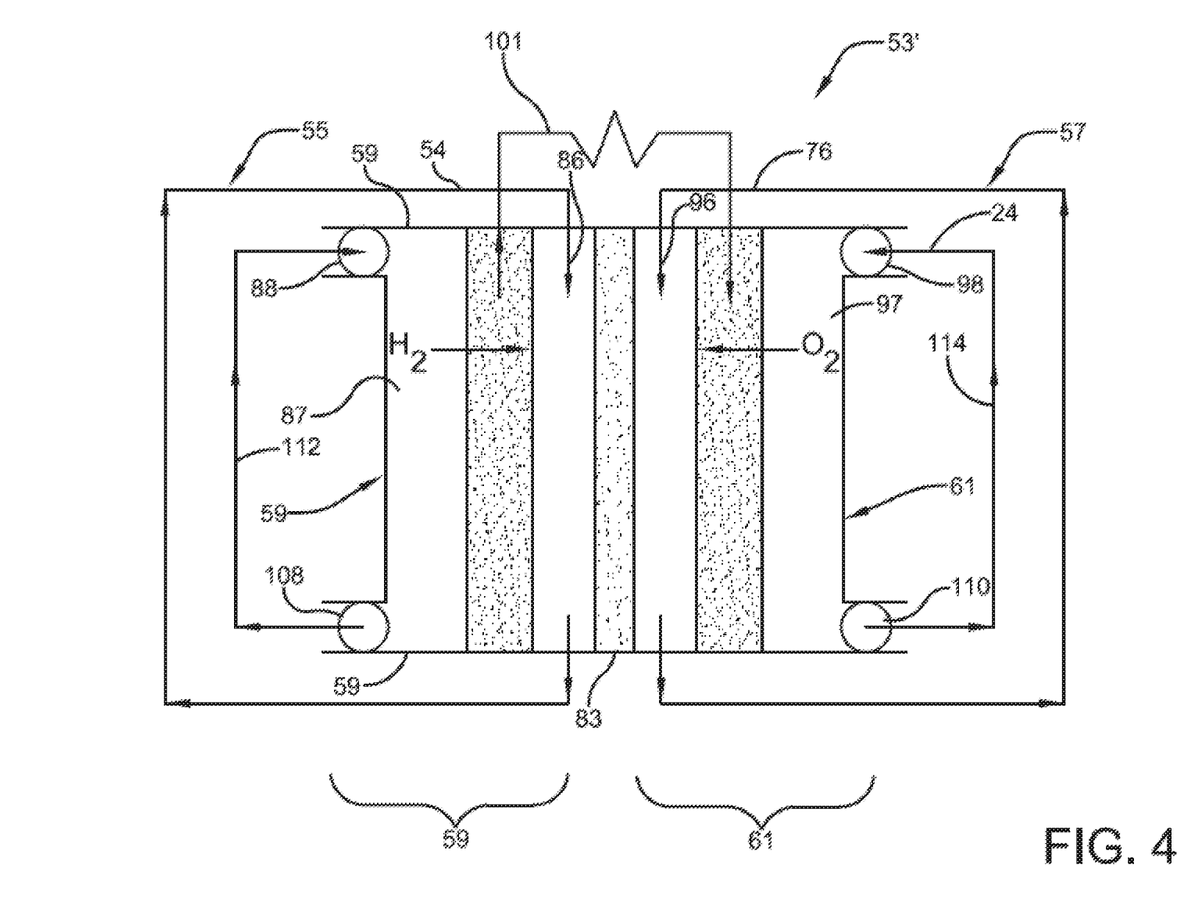
FIG. 4 is a schematic diagram of a cell liquor fuel cell employed in one or more embodiments of the present invention.

Within alternate embodiments, which are shown in FIG. 4, fuel cell 53' includes anode compartment 59 having outer chamber 87 with inlet 88 and outlet 108. As a result of this configuration, hydrogen gas stream 26 can flow through outer chamber 87 through a continuous loop 112. Likewise, cathode compartment 61 includes outer chamber 97 with inlet 98 and outlet 110. As a result of this configuration, oxygen stream 24 can flow through outer chamber 97 through a continuous loop 114. As with the configuration shown in FIG. 3, fuel cell 53' includes loop 55 through which cell liquor flows and loop 57 through which caustic flows.

Relative to FIG. 3, cell liquor feed 54 to fuel cell 53' is reversed whereby stream 54 is fed to inlet 86 located at top 57 of fuel cell 53' as opposed to bottom 59 of fuel cell 53 shown in FIG. 3. Likewise, caustic/water feed stream 76 is fed to inlet 96 located at top 57 as opposed to bottom 59 of fuel cell 53 as shown in FIG. 3. It should be appreciated that the features of cell 53 shown in FIG. 3 can be combined or interchanged with the features of cell 53' shown in FIG. 4. For example, gas stream loops 112, 114 shown in FIG. 4 can be combined with the overall configuration of cell 53 shown in FIG. 3.

Various modifications and alterations that do not depart from the scope and spirit of this invention will become apparent to those skilled in the art. This invention is not to be duly limited to the illustrative embodiments set forth herein.

What is claimed is:

1. A method for the production of alkali metal hydroxide solution, the method comprising:
   (i) treating a brine solution within a diaphragm cell to produce a first catholyte stream including from about 1 to about 20 wt % alkali metal hydroxide and about 1 to about 25 wt % alkali metal chloride;
   (ii) treating the first catholyte stream within a fuel cell including an ion exchange membrane to produce a first anolyte stream including from 10 to 15 wt % alkali metal hydroxide and from about 1 to about 25 wt % alkali metal chloride and a second catholyte stream including from about 25 to about 40 wt % alkali metal hydroxide and less than 500 ppm alkali metal chloride.

2. The method of claim 1, further comprising a step of generating electrical energy from the fuel cell.

3. The method of claim 1, further comprising a step of treating the first catholyte stream to adjust the ionic strength thereof prior to said step (ii) of treating the first catholyte stream.

4. The method of claim 1, further comprising a step of concentrating the first anolyte stream to form a diaphragm-grade caustic stream having an alkali metal hydroxide content of greater than 15 wt % alkali metal hydroxide.

5. The method of claim 4, where said step of concentrating takes place within a nickel or stainless steel evaporator.

6. The method of claim 4, where said step of concentrating includes evaporating water from the first anolyte stream.

7. The method of claim 1, where the alkali metal hydroxide is sodium hydroxide.

8. The method of claim 1, where the alkali metal chloride is sodium chloride.

9. The method of claim 4, where the diaphragm-grade caustic stream has an alkali metal hydroxide content of greater than 20 wt % alkali metal hydroxide.

10. The method of claim 4, where the diaphragm-grade caustic stream has an alkali metal hydroxide content of greater than 25 wt % alkali metal hydroxide.

11. The method of claim 1, where the first catholyte stream includes from about 10 to about 15 wt % alkali metal hydroxide.

12. The method of claim 1, where the ion exchange membrane includes a sulfonic layer.

13. The method of claim 1, where the ion exchange membrane includes a carboxylic layer.

14. The method of claim 13, where the carboxylic layer of the ion exchange membrane is oriented towards the cathode.

15. The method of claim 13, where the carboxylic layer of the ion exchange membrane is oriented towards the anode.

16. The method of claim 1, where the second catholyte stream includes from about 28 to about 38 wt % alkali metal hydroxide and less than 300 ppm alkali metal chloride.

17. A chloralkali method comprising steps of
converting a brine solution to an alkali metal hydroxide solution within a diaphragm cell, to thereby produce a resulting cell liquor from the diaphragm cell, introducing the resulting cell liquor from the diaphragm cell to a fuel cell including an ion exchange membrane for the conversion of the alkali metal hydroxide to form electricity and an anolyte stream including from 10 to 15 wt % alkali metal hydroxide, regulating the conversion of alkali metal hydroxide within the fuel cell to a conversion of less than 50%, and subsequently concentrating the alkali metal hydroxide in the anolyte stream from the fuel cell.

18. The method of claim 17, where the conversion of the alkali metal hydroxide within the fuel cell is maintained at a conversion of less than 30%.

19. The method of claim 17, where the alkali metal hydroxide is sodium hydroxide.

20. The method of claim 17, where the step of concentrating the alkali metal hydroxide achieves a solution containing at least 30 wt % alkali metal hydroxide.

21. The method of claim 17, where the step of concentrating takes place within a nickel or stainless steel evaporator.

22. The method of claim 17, where the ion exchange membrane includes a sulfonic layer.

23. The method of claim 17, where the ion exchange membrane includes a carboxylic layer.

24. The method of claim 23, where the carboxylic layer of the ion exchange membrane is oriented towards the cathode.

25. The method of claim 23, where the carboxylic layer of the ion exchange membrane is oriented towards the anode.

\* \* \* \* \*